United States Patent
Nam

(10) Patent No.: US 8,334,874 B2
(45) Date of Patent: Dec. 18, 2012

(54) APPARATUS AND METHOD FOR PROCESSING DATA

(75) Inventor: Kyong Uk Nam, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 802 days.

(21) Appl. No.: 12/125,709

(22) Filed: May 22, 2008

(65) Prior Publication Data

US 2009/0153572 A1    Jun. 18, 2009

(30) Foreign Application Priority Data

Dec. 12, 2007    (KR) .................. 10-2007-0128725

(51) Int. Cl.
G06F 15/16    (2006.01)
G06F 15/80    (2006.01)
G06F 13/14    (2006.01)

(52) U.S. Cl. ........ 345/502; 345/503; 345/504; 345/505; 345/520

(58) Field of Classification Search .......... 345/502–505, 345/520
See application file for complete search history.

(56) References Cited

U.S. PATENT DOCUMENTS

| | | | |
|---|---|---|---|
| 6,624,816 B1* | 9/2003 | Jones, Jr. ................. | 345/503 |
| 6,734,862 B1 | 5/2004 | Chapple et al. | |
| 6,850,240 B1 | 2/2005 | Jones, Jr. | |
| 7,461,275 B2* | 12/2008 | Belmont et al. .......... | 713/300 |
| 7,466,316 B1 | 12/2008 | Alben et al. | |
| 7,528,836 B2* | 5/2009 | Diard ..................... | 345/505 |
| 7,721,118 B1 | 5/2010 | Tamasi et al. | |
| 7,768,517 B2* | 8/2010 | Diard et al. ............. | 345/502 |
| 2003/0079085 A1 | 4/2003 | Ang | |
| 2005/0012579 A1 | 1/2005 | Underwood et al. | |
| 2005/0125797 A1 | 6/2005 | Gabrani et al. | |
| 2005/0244131 A1* | 11/2005 | Uehara .................... | 386/46 |
| 2007/0195099 A1 | 8/2007 | Diard et al. | |
| 2007/0285428 A1 | 12/2007 | Foster et al. | |
| 2008/0204460 A1* | 8/2008 | Marinkovic et al. ..... | 345/502 |
| 2009/0096797 A1 | 4/2009 | Du et al. | |

FOREIGN PATENT DOCUMENTS

CN    1443322 A    9/2003

* cited by examiner

Primary Examiner — Hau Nguyen
(74) Attorney, Agent, or Firm — Birch, Stewart, Kolasch & Birch, LLP

(57) ABSTRACT

Disclosed are an apparatus and a method for processing data, capable of controlling the use of a graphic controller based on data usage in a memory, a variation speed of a memory data value, and/or operating states/conditions of a system.

22 Claims, 8 Drawing Sheets

APPARATUS AND METHOD FOR PROCESSING DATA

BACKGROUND OF THE INVENTION

1. Field of the Invention

The present invention relates to an apparatus and a method for processing data, capable of controlling the use of a graphic controller.

2. Description of the Prior Art

Generally, a graphic mode has been used without taking into graphic data usage and the operating conditions/states of a system.

As shown in a block diagram of a system 100 of FIG. 1, an internal graphic controller (IGC) (not shown) provided inside a graphic memory control hub (GMCH) 12 or an external graphic controller (EGC) (not shown) provided outside the GMCH 12 is used by selectively operating toggle switches 11a and 11b provided on a keyboard 11. A corresponding graphic controller and a memory are set trough the rebooting of the system 100.

SUMMARY OF THE INVENTION

According to the present invention, an internal graphic controller (IGC) provided in a graphic memory control hub (GMCH), which is a kind of a graphic chip set, shares a system memory and/or at least one additional graphic controller is adaptively used to process data, based on data usage (particularly, graphic data usage) and a variation speed of a memory data value.

According to the present invention, the IGC and/or at least one internal/external graphic controller, which is additionally provided, is adaptively used based on the operating conditions/states of a system, for example, application programs in operation, the number of the application programs in operation, the existence of an AC adaptor, or a residual amount of battery power, so as to process graphic data.

According to the present invention, a controller is adaptively used through the selection of a user. For example, if the user selects an operating mode based on graphic data usage, the controller can operate only in the operating mode selected by the user without taking into consideration the operating conditions/states of a system, for example, a residual amount of battery power. In addition, the user can select at least one operating mode such that the controller operates only under the operating conditions/states of the system.

According to the present invention, an apparatus for processing data, the apparatus includes a central processing unit, a controller which controls a peripheral device, a memory unit, and a graphic/memory controller which is connected to the central processing unit, the memory unit and the first controller, and controls a system by taking into data usage of the memory unit or at least one operating condition/state of the system consideration.

According to the present invention, the graphic/memory controller includes a controller controlling graphic data.

According to the present invention, at least one controller, which controls graphic data, is provided outside the graphic/memory controller.

According to the present invention, a method for processing data includes the steps of setting data usage of controllers, processing data through a first controller, determining if data usage of the first controller is within a range of preset data usage, and processing data by using at least one controller together with the first controller if the data usage of the first controller exceeds the preset data usage.

DETAILED DESCRIPTION OF THE INVENTION

Hereinafter, an apparatus and a method for processing data according to the present invention will be described in more detail with reference to accompanying drawings.

Terms mentioned in the present invention, for example, a "graphic memory control hub (GMCH)" and an "input/output control hub (ICH)" refer to devices controlling a specific hardware of a whole system by integrating several microchips and several circuits. Although the GMCH and the ICH typically control various signals generated from a central process unit (CPU) and a main memory, which are important parts in a computer, and/or a disc device and peripheral devices, the GMCH and the ICH may be a controller having a small capacity and connected to a specific device in order to process and/or control graphic data.

In addition, although terms used in the present invention are selected from general terms that are currently used, an applicant may arbitrarily suggest terms in specific cases. Since the terms suggested by the applicant will be described in detail in relation to operations and meanings in a corresponding description part of the present invention, the present invention should be understood in relation to the operations and meanings represented in the terms instead of names of the terms.

Hereinafter, the present invention will be schematically described.

According to the present invention, graphic controllers are used based on graphic data usage determined by a graphic memory controller. For example, the type (IGC/EGC, etc.) and the number of the graphic controllers to be used are adaptively selected/controlled.

According to the present invention, the use and the number of controllers to process graphic data are adaptively controlled by taking into consideration operating conditions/ states of a system, for example, application programs in operation, the number of the application programs in operation, the type of power, such as an AC adaptor/a battery mode, a residual amount of battery power, and the selection of a system user.

According to the present invention, graphic data are effectively processed by using a first device for processing the graphic data and/or at least one second device for processing the graphic data, based on graphic data usage and/or the operating conditions/states of a system, thereby reducing system power consumption and improving system performance.

Figure 1:
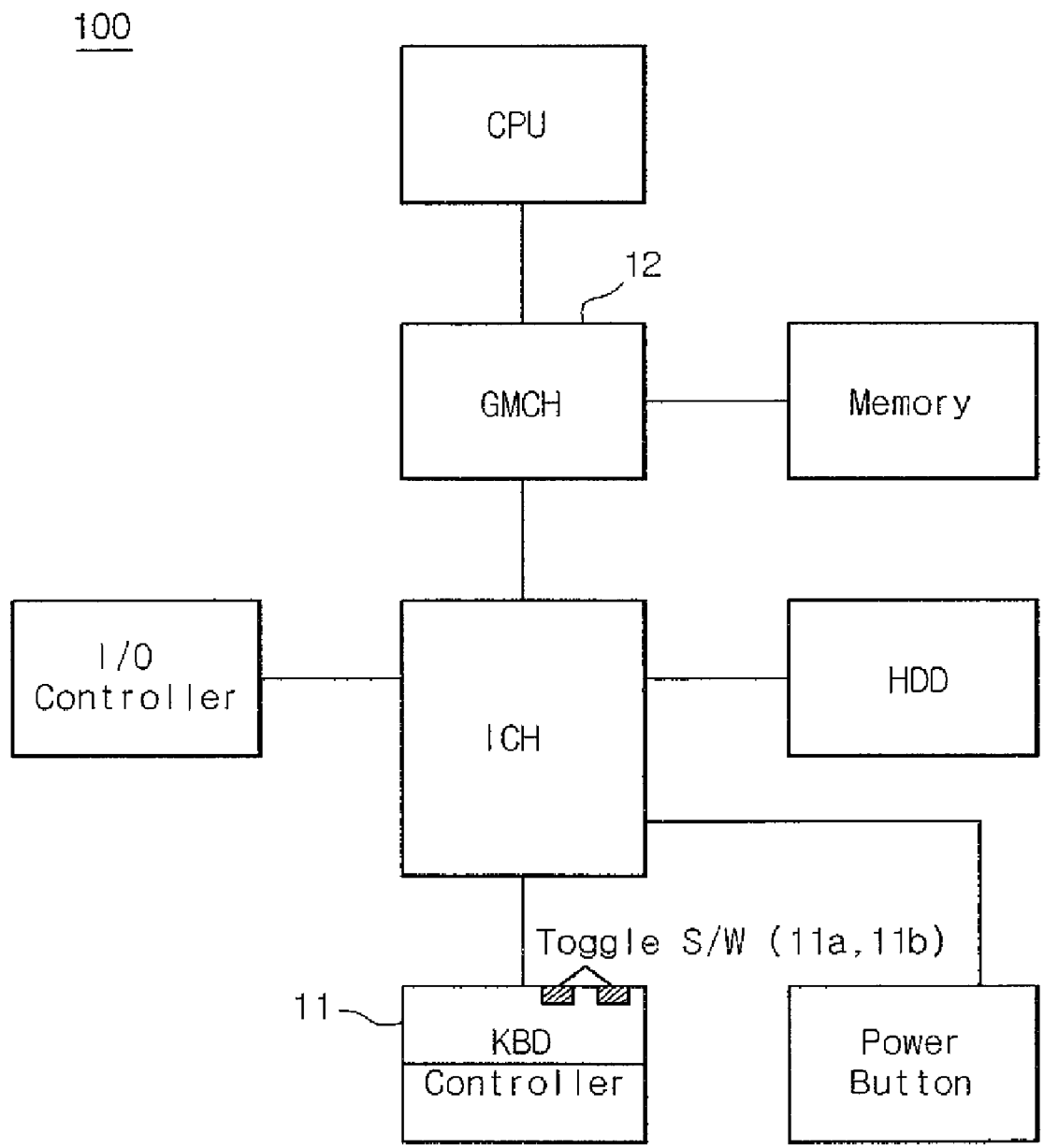
FIG. 1 is a block diagram showing a typical system including a graphic controller and a memory.
Figure 2:
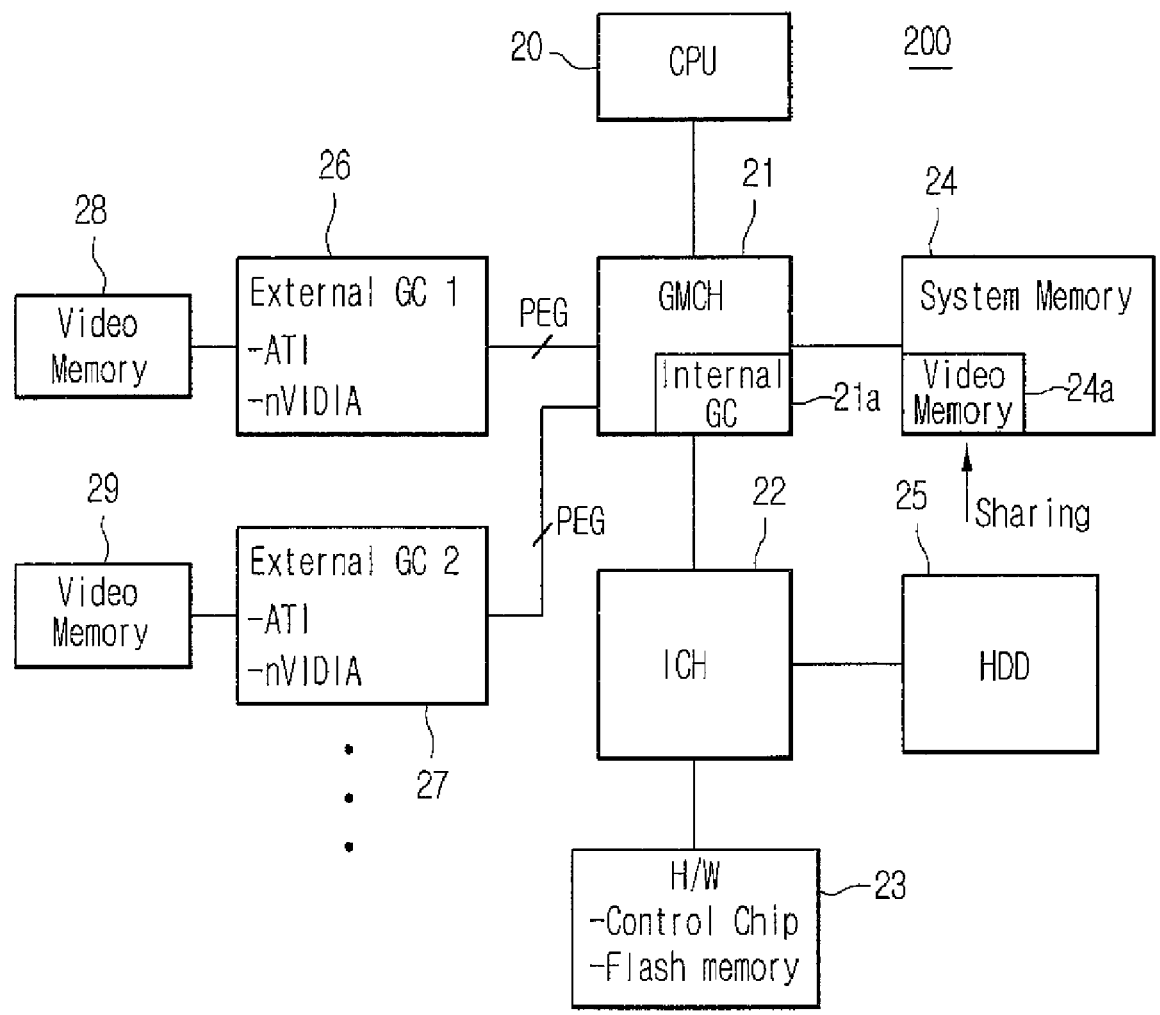
FIG. 2 is a block diagram showing a system including a graphic memory control hub (GMCH), a memory unit, and at least one graphic controller according to an embodiment of the present invention.

FIG. 2 is a block diagram showing a system 200 including a GMCH, a memory unit, and at least one graphic controller. As shown in FIG. 2, the system 200 includes a central processing unit (CPU) 20, a GMCH 21, and an ICH 22. The GMCH 21 is connected the CPU 20 to control an internal graphic controller (IGC) 21a, a random access memory (RAM), a system memory 24, and at least one of external graphic controllers 26 and 25 based on graphic data usage and/or the operating conditions/states of the system 200. The ICH 22 controls an HDD 25, which stores data including various programs and data run/processed based on the programs, and a main board H/W 23, on which a flash memory loading the data stored in the HDD 25 and a control chip are mounted.

The GMCH 21 includes a controller (not shown) which automatically selects and drives the IGC 21a, the GCI 26, or a GC2 27 based on the check results of the graphic data usage and/or the operating conditions/states of the system 200, after checking the graphic data usage and/or the operating conditions/states of the system 200. A component serving as the controller (not shown) may be additionally provided in the form of another one-chipset.

The GMCH 21 typically includes a graphic controller such as the IGC 21a. In such a structure, the graphic controller is accommodated in the chipset of the GMCH 21, and may have performance slightly inferior to that of first and second EGCs 26 and 27 provided outside the GMCH 21.

In addition, at least one of controller such as the first EGC 26, the second EGC 27, and a video memory 28 or 29 is additionally provided outside the GMCH 21.

Meanwhile, the video memories 28 and 29 may be provided in the first and second EGC 26 and EGC 27.

Although it is described as one example that the GMCH 21 makes data communication with the first EGC 26 and the second EGC 27 through a 16×PCI express graphics (PEG) bus interface, the data communication may be performed through various schemes.

Regarding the EGC, "ATI" and "nVIDIA" represent examples of companies that produce video chipsets.

Figure 3:
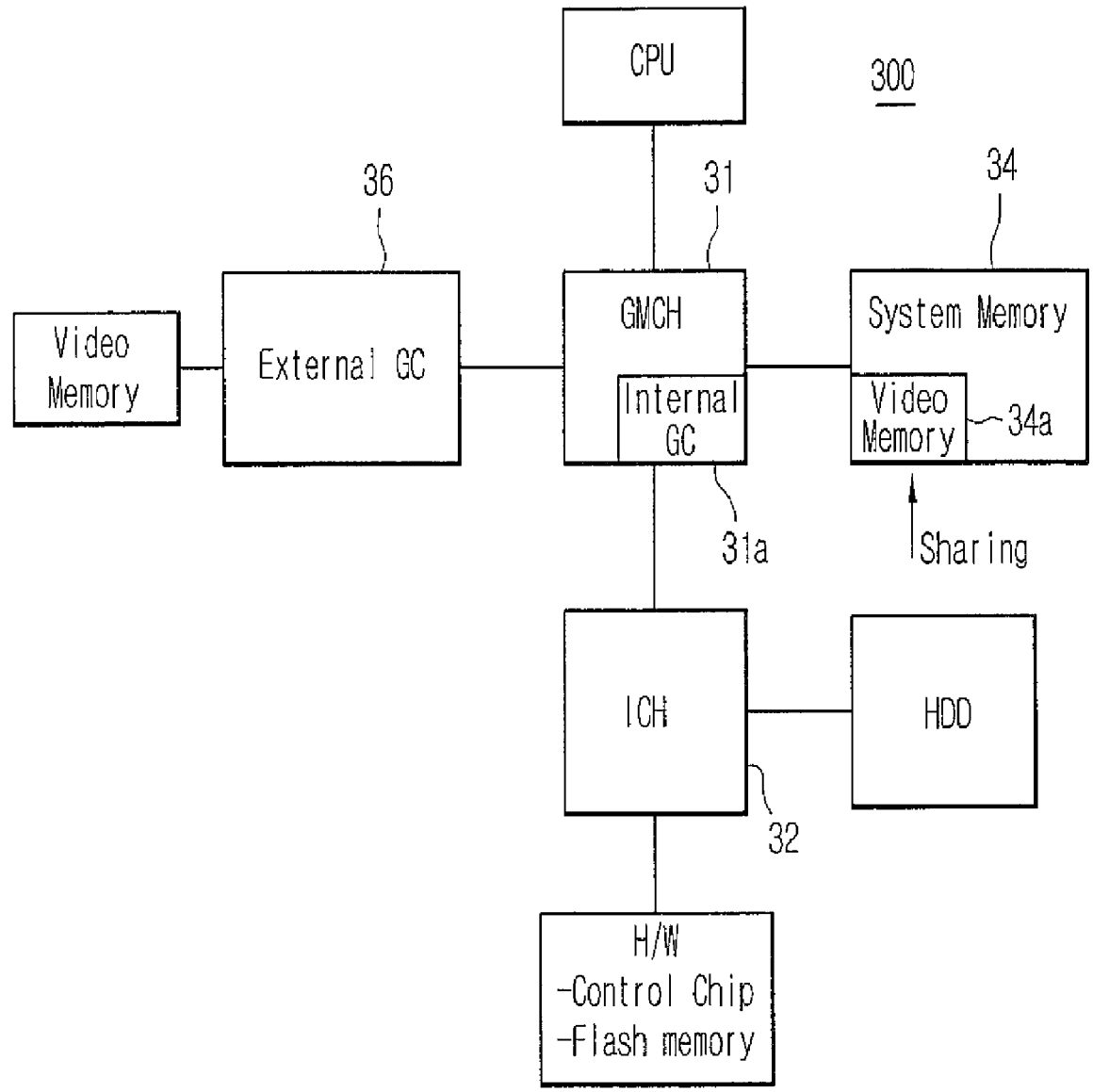
FIG. 3 is a block diagram showing a system using an external graphic controller (EGC) outside a GMCH and/or an internal graphic controller (IGC) inside the GMCH based on graphic data usage or at least one of operating conditions and states of the system so as to process graphic data according to an embodiment of the present invention.

FIG. 3 is a block diagram showing a system 300 that processes graphic data by using an EGC provided outside a GMCH 31 and/or an IGC 31a provided inside the GMCH 31 based on graphic data usage, or at least one operating conditions and states of the system 300 according to the first embodiment of the present invention.

The definition of operating modes of the system 300 shown in FIG. 3 is as follows:

The first operation mode: graphic data are processed by using only the IGC 31a of the GMCH 31 (a battery optimized mode: use only the IGC 31a);

The second operating mode: graphic data are processed by using only the EGC 36 provided outside the GMCH 31 (a normal mode: PM mode: use only the EGC 36); and The third operating mode: graphic data are processed according to the first and second operating modes (the maximum performance mode: use both of the IGC 31a and the EGC 36).

In this case, the first operating mode requires the least battery consumption, and the maximum performance mode requires the greatest battery consumption. However, in terms of performance, the third operating mode has the highest performance, and the first mode has the lowest performance.

According to one embodiment, the operating modes are adaptively changed and set based on the check results of preset graphic data usage and/or the operating conditions/states of the system 300 after the GMCH 31 checks graphic data usage of a system memory 34, or the ICH 32 checks the operating conditions/states of the system 300.

The above-mentioned operating modes may be classified as follows based on graphic data usage.

TABLE 1

| Data usage in graphic memory | Operating mode | Remarks |
| --- | --- | --- |
| 50% or less | $1^{st}$ operating mode | |
| 50%~70% | $2^{nd}$ operating mode | |
| 75% or more | $3^{rd}$ operating mode | |

The operation modes are adaptively used in a memory based on the data usage as described above, thereby reducing power consumption, and improving the performance of the system 300.

For example, when using only both of the IGC 31a of FIG. 3 and a video memory 34a of the system memory 34 in order to process graphic data, the system 300 automatically operates in the third operating mode if preset data usage (e.g., 75% or more) is output.

However, if the data usage by the IGC 31a exceeds a preset value, the system 300 raises the data usage up to a predetermined level by using another GC or the IGC 31a/the GC.

Meanwhile, as another embodiment of FIG. 3, the system 300 may automatically operate in the following two operating modes:

The first operating mode: only the IGC 31a is used (a battery optimized mode); and The third operating mode: both of the IGC 31a and the EGC 36 are used (the maximum performance mode).

TABLE 2

| Data usage in graphic memory | Operating mode | Remarks |
| --- | --- | --- |
| 50% or less | $1^{st}$ operating mode | |
| 50%~70% | Maintain present mode | |
| 75% or more | $3^{rd}$ operating mode | |

Regarding table 2, if the present operating mode is the first operating mode, and if present graphic data usage is checked as 55% (that is, 50%~70%), the first operating mode, which is the present operating mode, is continuously maintained. Meanwhile, if the present graphic data usage is 75% or more, the third operating mode is adaptively automatically set.

In FIG. 3, the operating modes having been defined according to the above graphic data usage may be set as follows based on the operating conditions/states of the system 300 independently from the graphic data usage. Hereinafter, examples of the operating conditions/states of the system 300 will be described.

First, the system 300 can automatically operate in the following operation modes according to the type of application programs in operation.

The first operating mode: only the IGC 31a is used (a battery optimized mode).

The third operating mode: both of the IGC 31a and the EGC 36 are used (the maximum performance mode).

TABLE 3

| Application programs in operation | Operating mode | Remarks |
|---|---|---|
| "Word", "Excel", or "Power Point" | $1^{st}$ operating mode | |
| Other programs (a CAD program, a web design program, etc.) | Maintain present operating mode | |
| Moving picture playing program | $3^{rd}$ operating mode | |

In table 3, when document programs such as "WORD" and "Power Point" are used, the first operating mode is set in order to reduce battery consumption. When other programs (a CAD program, a web design program, programs used for the search of the Internet, etc.) are used, a present operation mode (the first operating mode or the third operating mode) may be continuously maintained.

If an application program in operation is a moving picture playing program such as "windows media program", the third operating mode is set to improve system performance, so that user's demand for the system 300 can be satisfied.

The operation modes are adaptively set based on an amount of loads processed by an application program in operation, that is, the type of the application program as described above, thereby reducing power consumption and improving system performance.

Second, after checking the number of application programs in operation, the following two operation modes may be adaptively set.

The number of the application programs in operation can be checked by calculating the number of windows, which are currently activated.

According to one embodiment of the present invention, in order to check the number of the activated windows or the application programs in operation, a filter driver are stored in an HDD, and then stacked in a memory to operate after a window OS is booted, in which the filter driver is a kind of a preset program capable of detecting an activated program or at least one application program output on a display.

The first operating mode: only the IGC is used (a battery optimized mode).

The third operating mode: both of the IGC 31a and the EGC 36 are used (the maximum performance mode).

TABLE 4

| The number of application programs in operation | Operating mode | Remarks |
|---|---|---|
| 1 | $1^{st}$ operating mode | |
| 2 or 3 | Maintain present operating mode | |
| 4 or more | $3^{rd}$ operating mode | |

In table 4, when the number of application programs in operation is 1 so that the first operating mode is set, the first operating mode is continuously maintained even if the number of application programs to be operated is 2 or 3. However, if the number of application programs to be operated is 4 or more, the third operating mode is automatically set.

The operating modes are adaptively set based on the number of application programs in operation as described, thereby reducing power consumption and improving system performance.

If the number of application programs in operation is taken into consideration as described above, the operating mode of a program, such as a moving picture program that requires a greater amount of data processing, can be adjusted based on the number of application programs. For example, when determining the number of programs for the moving picture program, the number of the programs is determined as at least four even if one moving picture program is run, so that the third operating mode can be set.

In other words, the setting of the operating mode based on the type and/or the number of programs to be operated can be adjusted according to the characteristic of the programs as described above.

Third, the following two operating modes are automatically set according to the type of power in use.

The first operating mode: only the IGC 31a is used (a battery optimized mode).

The third operating mode: both of the IGC 31a and the EGC 36 are used (the maximum performance mode).

TABLE 5

| power in use | Operating modes | Remarks |
|---|---|---|
| Only battery | $1^{st}$ operating mode | |
| AC adaptor | $3^{rd}$ operating mode | |

The operating modes are adaptively set based on the power in use as described above, thereby reducing power consumption and improving system performance.

Fourth, two operating modes can be automatically set according to a residual amount of battery power. Preferably, the following two operating modes may be set.

The first operating mode: only the IGC 31a (a battery optimized mode) is used.

The third operating mode: both of the IGC 31a and the EGC 36 (the maximum performance mode) are used.

TABLE 6

| Residual amount of battery power | Operating mode | Remarks |
|---|---|---|
| 50% or less | $1^{st}$ operating mode | |
| 50%~75% | Maintain a present mode | |
| 75% or more | $3^{rd}$ operating mode | |

In table 6, on the assumption that a present mode is the first operating mode, if the residual amount of battery power is in the range of 50% to 75% of a battery capacity, the first operating mode is maintained as the present mode. Meanwhile, if the residual amount of the battery power is 75% or more, the third operating mode is automatically set.

Referring to FIG. 3, differently from table 6, the following three operating modes are defined, and a corresponding mode is adaptively and automatically set as shown in table 7.

The first operating mode: only the GMCH 31 and the IGC 31a (a battery optimized mode) is used.

The second operating mode: only the EGC 36 (a normal mode) is used.

The third operating mode: both the IGC 31a and the IGC 36 (the maximum performance mode) are used.

In this case, the first operating mode requires the least battery consumption, and the maximum performance mode, which is the third operating mode, requires the most battery mode. Meanwhile, in terms of performance, the third operating mode has the highest performance, and the first operating mode has the lowest performance.

TABLE 7

| Residual amount of battery power | Operating mode | Remarks |
|---|---|---|
| 50% or less | $1^{st}$ operating mode | |
| 50%~75% | $2^{nd}$ operating mode | |
| 75% or more | $3^{rd}$ operating mode | |

In table 7, if a residual amount of battery power is in the range of 50% to 70% of the battery capacity on the assumption that a present operating mode is the first operating mode (a residual amount of battery power is 50% or less), the present operating mode is automatically switched from the first operating mode into the second operating mode. Meanwhile, if the residual amount of the battery power is 75% or more, the present operating mode is automatically switched into the third operating mode.

The operating modes are adaptively set based on a residual amount of battery power as described above, so that power can be effectively used, and system performance can be improved.

Figure 4:
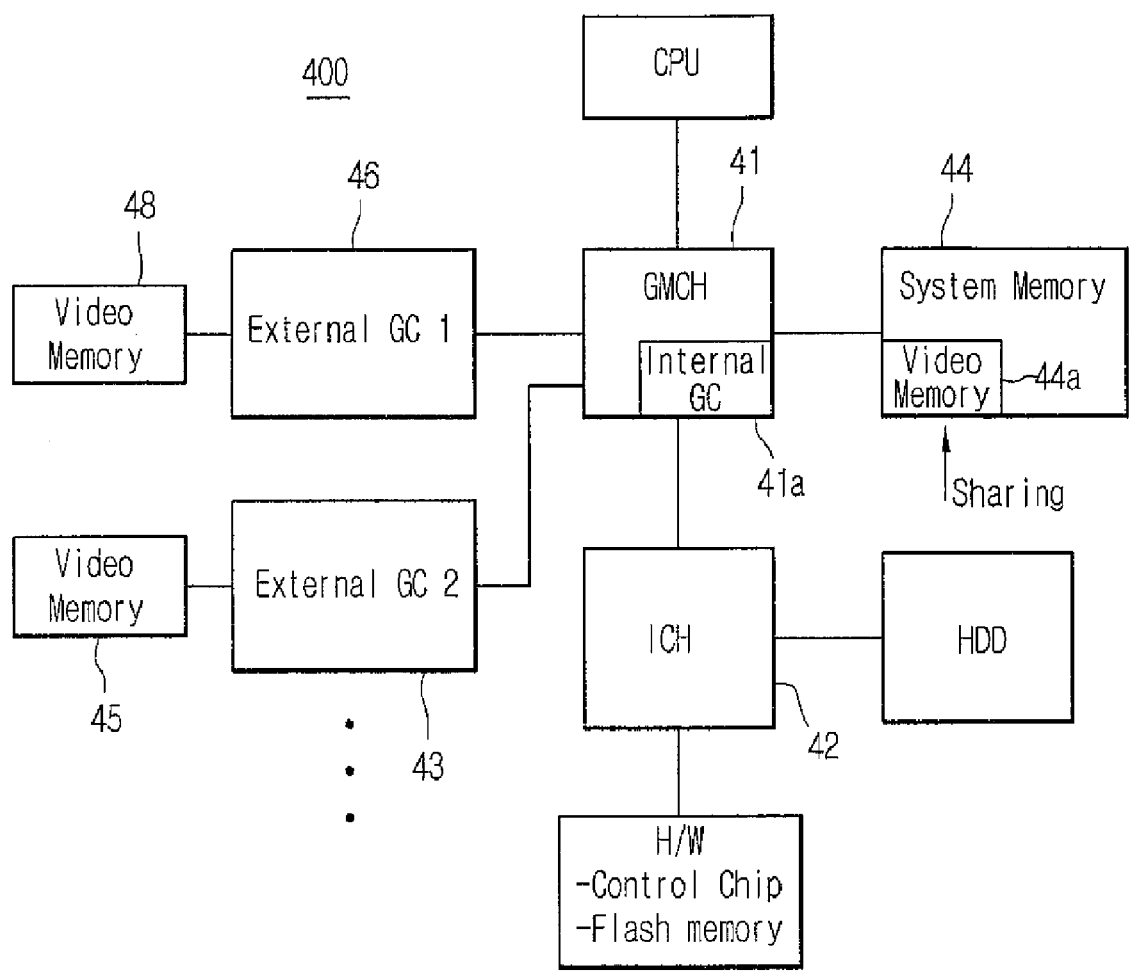
FIG. 4 is a block diagram showing a system processing graphic data by taking into consideration graphic data usage or at least one of operating conditions and states of the system according to another embodiment of the present invention.

FIG. 4 is a block diagram showing a system 400 according to another embodiment of the present invention, in which the system 400 processes graphic data by using first and second EGCs 46 and 43 and first and second video memories 48 and 45, which are provided outside a GMCH 41, and/or a IGC 41a provided inside the GMCH 41 and a video memory 44a in a system memory 44.

Operating modes in the system 400 having the above structure are defined as follows:

The first operating mode: graphic data are processed only by using the IGC 41a provided inside the GMCH 14 (a battery optimized mode);

The second operating mode: graphic data are processed only by using the first EGC 46; and The fourth operating mode: graphic data are processed only by using the first EGC 46 and the second EGC 43 (the maximum performance mode).

In this case, the greatest amount of battery power is consumed in the fourth operating mode, and the least amount of battery power is consumed in the first operating mode. Meanwhile, in terms of system performance, the fourth operating mode has the highest performance.

The operating modes are adaptively changed and set based on the check results of preset graphic data usage and/or the operating conditions/states of the system 400 after the GMCH 41 checks graphic data usage of the system memory 44, or an ICH 42 checks the operating conditions/states of the system 400.

For example, the operating modes may be set as follows based on graphic data usage.

TABLE 8

| Data usage in graphic memory | Operating modes | Remarks |
|---|---|---|
| 50% or less | $1^{st}$ operating mode | |
| 50%~70% | $2^{nd}$ operating mode | |
| 70% or more | $4^{th}$ operating mode | |

The operating modes are adaptively set based on data usage in a graphic memory as described above, thereby reducing power consumption and improving system performance.

In addition, the operating modes described above may be set as follows based on the operating conditions/states of the system 400. Hereinafter, examples of the operating conditions/states of the system 400 will be described.

TABLE 9

| Application programs in operation | Operating modes | Remarks |
|---|---|---|
| Word, Excel, or Power point | $1^{st}$ operating mode | |
| Other programs (CAD program, web design program, etc.) | $2^{nd}$ operating mode | |
| Moving picture program, game program, etc. | $4^{th}$ operating mode | |

The other programs include a CAD program, a web design program, and a program allowing a user to search the Internet, and the second operating mode is preferably set for programs requiring system resources less than system resources required for a moving picture program.

The operating modes are adaptively set based on the programs in operation as described above, thereby reducing power consumption and improving system performance.

In addition, the operating modes may be set as follows based on application programs to be operated.

TABLE 10

| The number of application programs to be operated | Operating modes | Remarks |
|---|---|---|
| 1 | $1^{st}$ operating mode | |
| 2 or 3 | Maintain a present mode | |
| 4 or more | $4^{th}$ operating mode | |

In table 10, it is assumed that the first operating mode is set if one application program is currently in operation. Meanwhile, even if the number of application programs to be operated is two or three, the first operating mode, which is a present operating mode, is continuously maintained. However, if the number of application programs to be operated is four or more, the fourth operating mode is automatically set.

The operating modes are adaptively set based on the number of programs to be operated as described above, thereby reducing power consumption and improving system performance. If the number of programs to be operated is taken into consideration as described above, in a program, such as a moving picture program, requiring the processing of a greater amount of data, a program number according to the operating modes can be adjusted.

In other words, when determining a program number in the moving picture program, the program number is determined as at least four, so that the four operating mode can be set.

Further, the setting of the operating modes based on the type or the number of programs to be operated can be adjusted according to a program characteristic.

The operating modes may be set as follows based on the type of power.

TABLE 11

| Power | Operating modes | Remarks |
|---|---|---|
| Only battery | $1^{st}$ or $2^{nd}$ operating mode | |
| AC adaptor | $4^{th}$ operating mode | |

The operating modes are adaptively set based on power as described above, thereby reducing power consumption and improving system performance.

In addition, the operating modes may be set based on a residual amount of battery power.

TABLE 12

| Residual amount of battery power | Operating modes | Remarks |
|---|---|---|
| 50% or less | $1^{st}$ operating mode | |
| 50% to 70% | $2^{nd}$ operating mode | |
| 75% or more | $4^{th}$ operating mode | |

The operating modes are adaptively set based on a residual amount of battery power, thereby effectively using power and improving system performance.

Figure 5:
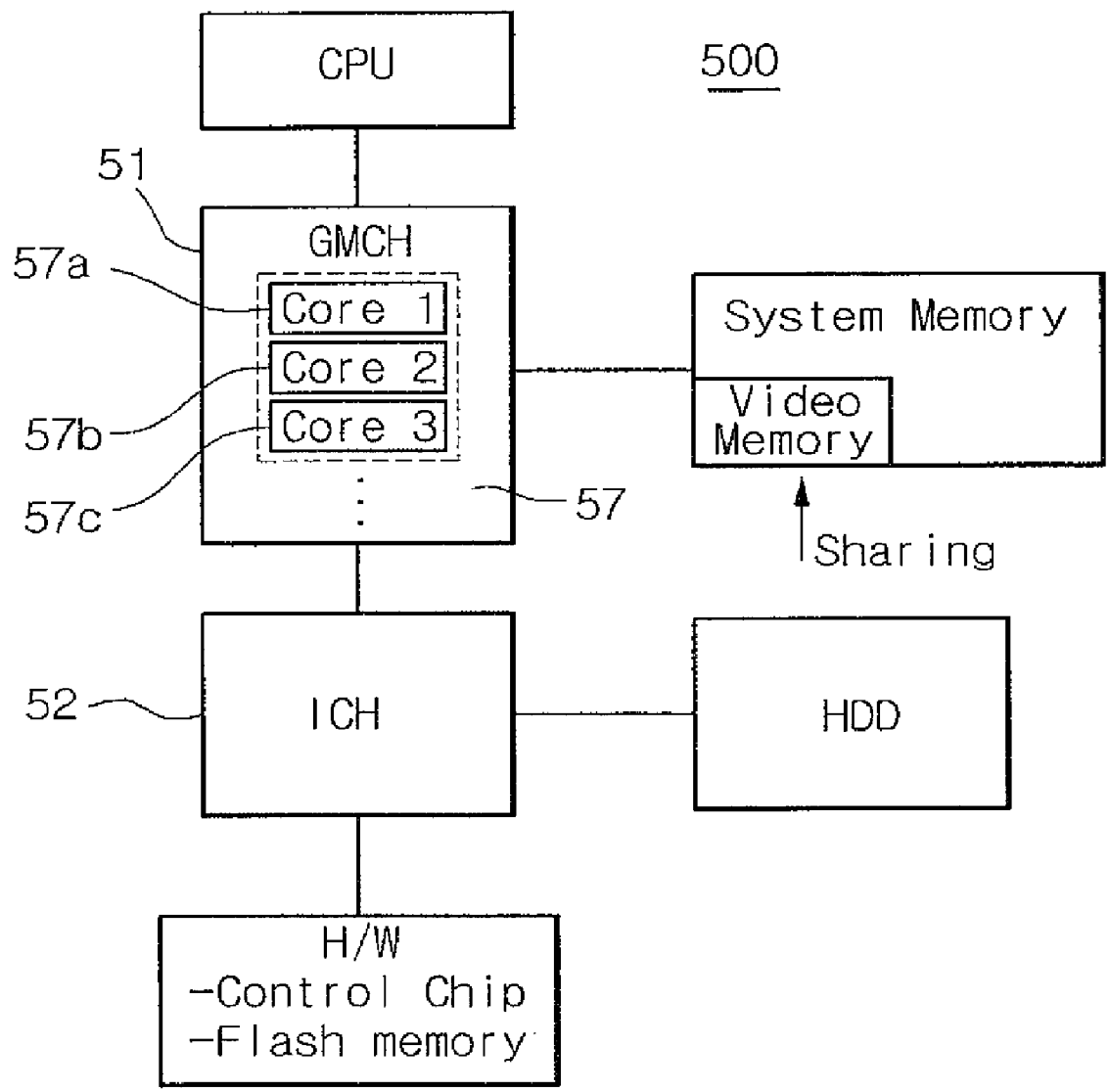
FIG. 5 is a block diagram showing a system including a GMCH provided therein with an IGC, and processing graphic data by using a plurality of cores provided in the IGC according to another embodiment of the present invention.

FIG. 5 is a block diagram showing a system 500 including a GMCH 51 provided with an IGC 57 according to another embodiment of the present invention, in which a plurality of cores 57a to 57c included in the IGC 57 process graphic data based on at least one of data usage, and the operating conditions and states of the system 500. The cores 57a to 57c serve as a plurality of engines to process graphic data, and are realized on one chipset.

In the system 500 having the above structure, the operating modes are defined as follows.

The sixth operating mode: graphic data are processed by using only the first core 57a of the IGC 57 embedded in the GMCH 51.

The seventh operating mode: graphic data are processed by using only the first and second cores 57a and 57b of the IGC 57 embedded in the GMCH 51.

The eighth operating mode: graphic data are processed by using only the first, second, and third cores 57a, 57b, ad 57c of the IGC 57 embedded in the GMCH 51.

The operating modes are adaptively changed and set based on preset data usage and/or checked operating conditions/states of the system 500 after the GMCH 51 checks data usage in a graphic memory through the cores, and the ICH 52 checks the operating conditions/states of the system 500.

For example, the operating modes may be set as follows based on graphic data usage.

TABLE 13

| Data usage in a graphic memory | Operating modes | Remarks |
|---|---|---|
| 50% or less | $6^{th}$ operating mode | |
| 50%~70% | $7^{th}$ operating mode | |
| 75% or more | $8^{th}$ operating mode | |

The operating modes are adaptively set based on data usage in the graphic memory as described above, thereby reducing power consumption and improving system performance.

In addition, the operating modes described above may be set as follows based on the operating conditions/states of the system 500. Hereinafter, examples of the operating conditions/states of the system 500 will be described.

The operating modes are set or adaptively selected based on programs in operation.

TABLE 14

| Application programs in operation | Operating mode | Remarks |
|---|---|---|
| Word, Excel, Power Point | $6^{th}$ operating mode | |
| Other programs (CAD program, web design program, etc.) | $7^{th}$ operating mode | |
| Moving picture program, Game program | $8^{th}$ operating mode | |

The operating modes are adaptively set based on the application programs in operation as described above, thereby reducing power consumption and improving system performance.

TABLE 15

| The number of application programs to be operated | Operating modes | Remarks |
|---|---|---|
| 1 | $6^{th}$ operating mode | |
| 2 or 3 | $7^{th}$ operating mode | |
| 4 or more | $8^{th}$ operating mode | |

The operating modes are adaptively set based on the number of application programs to be operated, thereby reducing power consumption and improving system performance.

When the number of application programs to be operated is taken into consideration as described above, the adjustment of the number of programs according to the operating modes can be achieved with respect to a program, such as a moving picture program, having a greater number of data to be processed.

In other words, as described above, the setting of the operating modes based on the type and the number of programs to be operated can be adjusted according to a program characteristic.

TABLE 16

| Power | Operating modes | Remarks |
|---|---|---|
| Battery | $6^{th}$ or $7^{th}$ operating mode | |
| AC adaptor | $8^{th}$ operating mode | |

The operating modes are adaptively set based on power as described above, thereby reducing power consumption and improving system performance.

TABLE 17

| Residual amount of battery power | Operating modes | Remarks |
|---|---|---|
| 50% or less | $6^{th}$ operating mode | |
| 50%~75% | $7^{th}$ operating mode | |
| 75% or more | $8^{th}$ operating mode | |

The operating modes are adaptively set based on a residual amount of the battery power as described above, thereby effectively using power and improving system performance.

Figure 6:
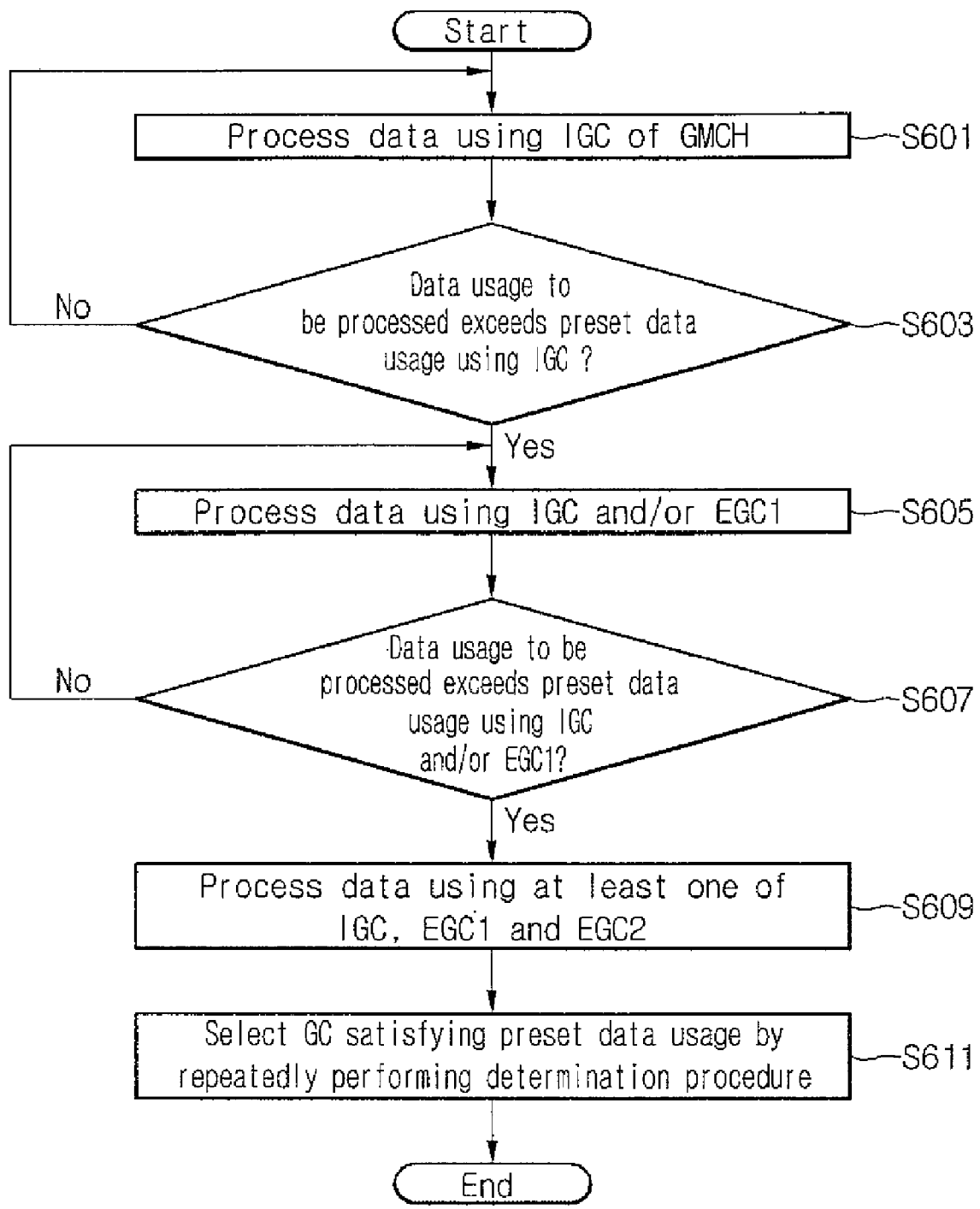
FIG. 6 is a flowchart showing the adaptive use of a graphic controller (GC) based on graphic data usage.

FIG. 6 is a flowchart showing the adaptive use of a graphic controller based on graphic data usage. Hereinafter, the whole operating procedure for the adaptive use of the graphic controller will be described again even though the adaptive use of the graphic controller has been described above.

As shown in FIGS. 3 and 4, when data are processed by using the IGC (internal GC) of the GMCH and/or at least one EGC (external GC), the IGC is first used (step S601).

It is determined if data usage using the IGC 31a or 41a exceeds a preset value (step S603).

Embodiments of the preset value and the operating modes relating to the data usage are shown in tables 1 and 8.

If an amount of data processed or to be processed by the IGC in operation exceeds the preset data usage, only an additional GC, for example, the first EGC is used, or both the first EGC1 and the IGC are used to process the data (step S605).

If the amount of data processed or to be processed by the IGC in operation exceeds the preset data usage, it means that the amount of graphic data being currently processed is more increased. The example thereof has been described above in detail.

Figure 8:
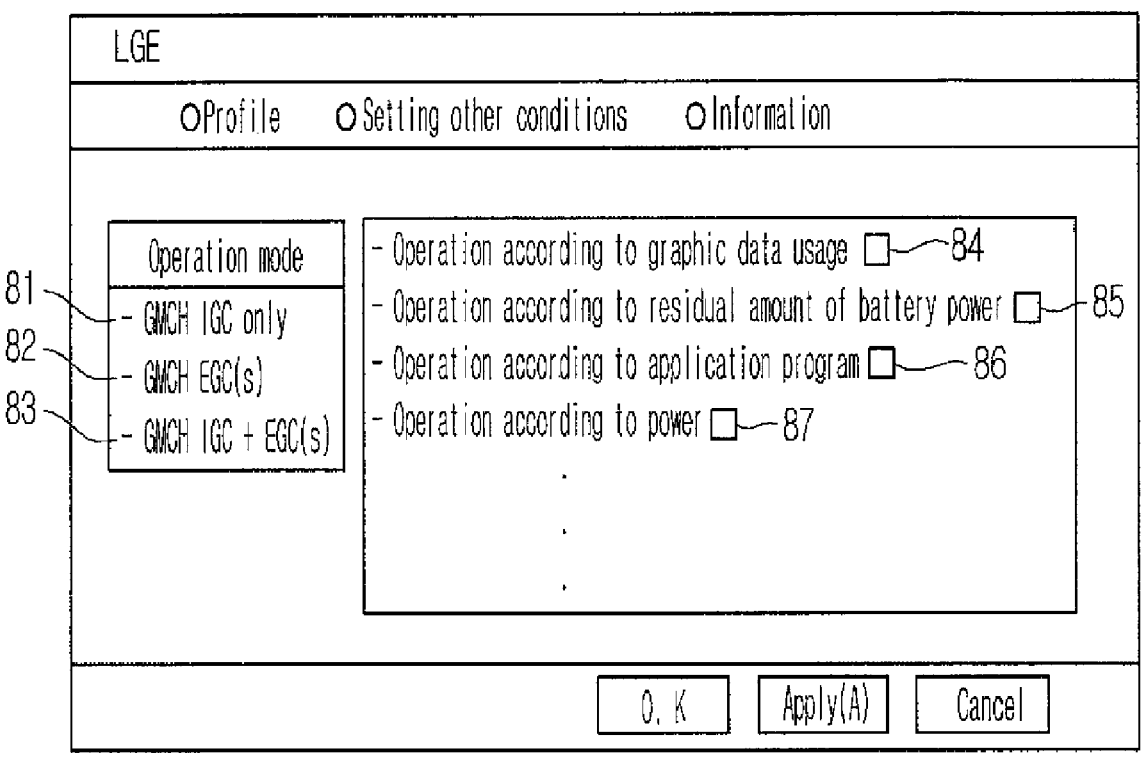
FIG. 8 is a view showing that a GC is selected and operated only under a condition set by a user, according to one embodiment of the present invention.

For example, as shown in table 1, if data usage is 50% or less in a graphic memory, the graphic data are processed by using only the IGC 31a of the GMCH 31, called the first operating mode. If the data usage in the graphic memory is in the range of 50% to 75%, the graphic data are processed by using only the EGC 36 of the GMCH 31, called the second operating mode. If the data usage in the graphic memory exceeds 75%, the graphic data are processed based on the first and second operating modes, called the third operating mode. In addition, as shown in FIG. 8, the fourth operating mode may be set.

Another IGC 57 may be provided in addition to the above IGC. In this case, as shown in FIG. 5, only the IGC 57 may be used or the IGC 57 is used together with an existing IGC (not shown).

In detail, if an amount of data to be processed exceeds the preset value of data usage using the IGC as the determination result of step S603, the data are processed by using the IGC or at least one of the IGC and the first EGC.

Thereafter, it is determined if the amount of the data to be processed exceeds the preset value of the data usage using at least one of the IGC or the EGCI (step S607).

If the amount of the data cannot be processed by the IGC and the first EGC in operation that is an amount of data to be processed more increases, an additional GC, for example, the second EGC is used together with the IGC and the first EGC to process the data (step S609).

Thereafter, the determination steps (steps S603 and S607) are repeatedly performed, so that a GC satisfying preset data usage can be automatically selected (step S611).

Figure 7:
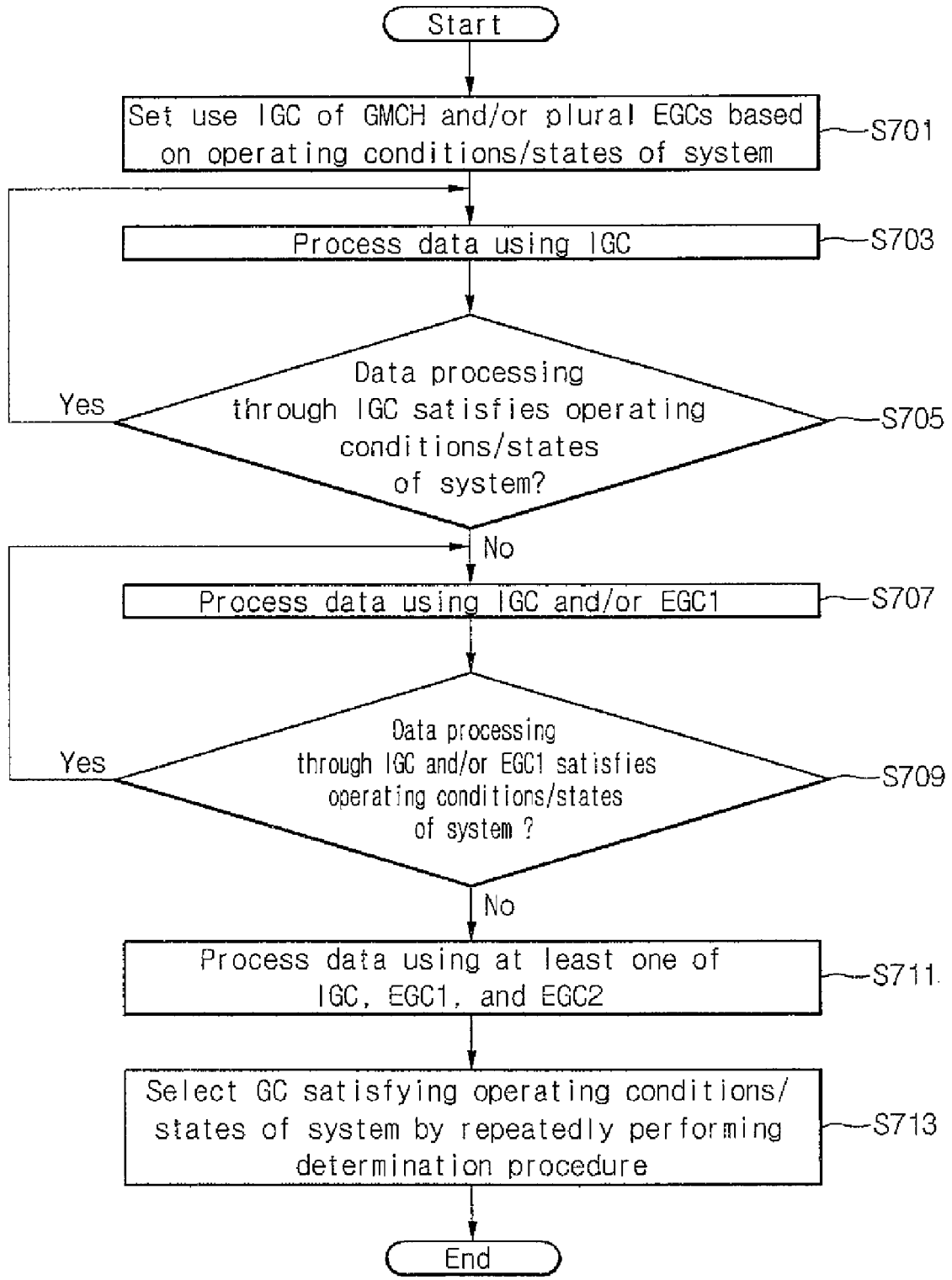
FIG. 7 is a flowchart showing the adaptive use of a GC based on operating conditions and states of a system.

FIG. 7 is a flowchart showing the adaptive use of a graphic controller (GC) based on the operating conditions and states of a system according to another embodiment of the present invention.

It is set that data are processed by using the IGC (internal GC) of the GMCH and/or at least one EGC (external GC) shown in FIGS. 2, 3, and 4 according to the operating conditions/states (refer to tables 2 to 7 and tables 9 to 12) (step S701).

It is assumed that data are processed by using the IGC (step S703).

In step S703, the EGC may be first used.

The use sequence of the IGC and the EGC may be changed according to user setting in the whole embodiments of the present invention. In addition, the present invention may be realized by providing plural IGCs and a single EGC, and plural IGCs and plural EGCs.

It is determined if the data processing by the IGC satisfies the operating conditions/states of a system set in each table (step S705). The operating conditions/states include an amount of residual battery power, the type of an application program, the number of programs in operation, or the use of an AC adaptor, and this has been described above.

If the set operating condition of the system is not satisfied as the determination result only the IGC or the additional GC (e.g., the first EGC) is used, or the IGC is used together with the first EGC to process data (step S707).

It is determined if data processing by the IGC and/or the first EGC satisfies the operating conditions/states of the system set in the tables (step S709).

If the data processing by the IGC and/or the first EGC does not satisfy the operating conditions/states of the system set in the tables, only the additional GC (e.g., the second EGC) is used, or the second EGC is used together with the IGC and the first EGC to process data (step S711).

The determination steps are repeatedly performed to continuously process data by using a GC satisfying the operating conditions/states of the system (step S713).

The combination of the IGC and the EGC shown in FIGS. 6 and 7 is one embodiment, and the IGC and the EGC are variously combined according to data usage/the operating states/conditions of the system.

FIG. 8 is a view showing that a graphic controller is adaptively selected and operated only through the condition set by a user according to one embodiment of the present invention.

As shown in FIG. 8, the present invention basically relates to that the IGC and/or at least one EGC 81, 82, or 83 is adaptively selected and operated.

The operating modes that can be set by a user are as follows for example.

1) A graphic controller is adaptively selected and operated based on only graphic data usage (reference number 84).
2) A graphic controller is adaptively selected and operated based on only an amount of residual battery power (reference number 85).
3) A graphic controller is adaptively selected and operated based on only an application program (reference number 86).
4) A graphic controller is adaptively selected and operated based on only power (reference number 87).

The graphic controller may be adaptively selected and operated by taking into only one of the operating modes set by a user consideration.

As described above, in the apparatus and method for processing data according to the embodiments of the present invention at least one IGC having a graphic core and at least one EGC using a graphic chip are provided inside and outside a GMCH, respectively, according to the position of components processing graphics. Accordingly, the embodiments of the present invention relate to that at least one core is provided in the IGC, the first EGC, the second EGC, and the IGC, and adaptively selected and operated based on data usage, or the operating conditions/states of a system.

The data usage is obtained by using information about the variation speed of data values of memories connected to the GCs.

According to the embodiment to determine the variation speed of data values of the memories, operation values processed in the GC/graphic core are written/read in the graphic memory in a state in which the GC or the graphic core is connected to the graphic memory. In this case, the data variation can be obtained by sensing the active degree of a data line between the two components. In detail, since the voltage of each data line can be measured, low and high levels are previously determined according to the voltage level. Thus, data variation from the low to high or vice versa can be checked.

In addition, the variation speed of data values of the memories may be obtained by determining a speed at which write/read register values are changed in the GC/graphic core and/or the memory.

The data usage may be measured similarly to a technology of measuring CPU usage. For example, present CPU usage can be automatically measured by using the idle thread or the registry information of the system. The graphic data usage may be measured similarly to that of the CPU. The type and the number of GCs to be used are adaptively set based on the measurement result for the variation speed of data values in a system memory to operate the system.

In addition, the system operates by adaptively setting the type and the number of GCs to be used by taking into consideration the operating conditions/states of the system, for example, the type and the number of programs in operation, an amount of residual battery power and/or power.

As described above, in the apparatus and method for processing data according to the present invention, controllers processing graphic are adaptively selected and operated based on graphic data usage, the variation speed of a memory data value, and the operating conditions/states of a system, so that system power can be effectively used, and system performance can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for processing data, the apparatus comprising:
    a first graphic controller configured to be in an enabled state to thereby process a first image associated with a first application or a first image associated with a second application;
    a second graphic controller configured to process a second image associated with the second application; and
    a controller operatively connected to the first and second graphic controllers and configured to change a state of the second graphic controller from an inactive state to an enabled state after the second application is initiated so that both the first and second graphic controllers are simultaneously in their respective enabled states so that the second application uses both of the first and second graphic controllers for processing and displaying the first and second images associated with the second application,
    wherein, when at least one of the first application and the second application is not in operation, a state of at least one of the first graphic controller and the second graphic controller is changed to an inactive state from an enabled state.

2. The apparatus as claimed in claim 1, wherein the first and second applications are assigned to the first graphic controller and the second application is assigned to the second graphic controller in a profile based on a corresponding application type or based on an amount of data to be processed by the corresponding applications.

3. The apparatus as claimed in claim 2, wherein the profile is displayable by the apparatus.

4. The apparatus as claimed in claim 1, further comprising:
    a first memory associated with the first graphic controller; and
    a second memory included in the second graphic controller,
    wherein a data transmission between the first memory and the second memory occurs if the state of the at least one of the first graphic controller and the second graphic controller is changed.

5. The apparatus as claimed in claim 4, wherever the first and second applications are assigned to the first graphic controller and the second application is assigned to the second graphic controller in a profile based on a data usage in the first memory unit or based on a variation speed of a data value of the first memory unit and a state of the apparatus.

6. The apparatus as claimed in claim 1, wherein at least one of the first and second graphic controllers includes a plurality of cores configured to process data.

7. The apparatus as claimed in claim 6, wherein the controller is configured to adaptively change a number of the plurality of cores to be operated based on one of a data usage in a memory unit, a variation speed of a data value of the memory unit and an operating state of the apparatus.

8. The apparatus as claimed in claim 6, wherein the at least one of the first and second graphic controllers is configured to adaptively select at least one of the plurality of cores based on one of a data usage in a memory unit, a variation speed of a data value of the memory unit and an operating state of the apparatus.

9. The apparatus as claimed in claim 1,
    wherein the first graphic controller is integrated into a chipset adapted to perform at least one function in addition to processing the first image, and
    wherein the second graphic controller is not integrated into the chipset.

10. The apparatus as claimed in claims 1, wherein the second graphic controller has a processing speed faster than a processing speed of the first graphic controller.

11. A method for displaying graphic images, the method performed by a data processing apparatus that includes a first graphic controller and a second graphic controller, the method comprising:
    executing, by the data processing apparatus, a specific application;
    processing, by the first graphic controller which is in an enabled state, graphic images associated with the specific application;
    determining, by the data processing apparatus, whether or not the specific application has been previously assigned to the second graphic controller; and
    changing, by the data processing apparatus, a state of the second graphic controller from an inactive state to an enabled state when the specific application has been determined to have been assigned to the second graphic controller such that both the first and second graphic controllers are simultaneously in their respective enabled states to handle a process for displaying the graphic images associated with the specific application,
    wherein, when at least one of the first application and the second application is not in operation, a state of at least one of the first graphic controller and the second graphic controller is changed to an inactive state from an enabled state.

12. The method of claim 11, wherein the specific application is assigned to either the first graphic controller or to the first and second graphic controller in a profile based on a corresponding application type or based on an amount of data to be processed by the specific application.

13. The method as claimed in claim 12, wherein the profile is displayable by the data processing apparatus.

14. The method as claimed in claim 11,
    wherein the first graphic controller is integrated into a chipset adapted to perform at least one function in addition to processing the first image, and
    wherein the second graphic controller is not integrated into the chipset.

15. A method for displaying graphic images, the method performed by a data processing apparatus that includes a first graphic controller and a second graphic controller, the method comprising:
- executing, by the data processing apparatus, a first application;
- processing, by the first graphic controller which is in an enabled state, graphic images associated with the first application while the second graphic controller is in an inactive state associated with a battery save mode;
- initiating, by the data processing apparatus, a second application, the second application being one of a new application or a component of the first application;
- determining, by the data processing apparatus, whether or not the second application has been previously assigned to the second graphic controller; and
- changing, by the data processing apparatus, a state of the second graphic controller from an inactive state to an enabled state when the second application has been determined to have been assigned to the second graphic controller such that both the first and second graphic controllers are simultaneously in their respective enabled states to handle a process for displaying graphic images associated with the second application,
- wherein the second application is assigned to either the first graphic controller or to the first and second graphic controller in a profile and based on a corresponding application type or based on an amount of data to be processed by the second application, and
- wherein, when at least one of the first application and the second application is not in operation, a state of at least one of the first graphic controller and the second graphic controller is changed to an inactive state from an enabled state.

16. The method as claimed in claim 15, wherein the profile is displayable by the data processing apparatus.

17. The method as claimed in claim 16, wherein the second application is assigned to either the first graphic controller or to the first and second graphic controller based on one of a data usage in a memory unit, a variation speed of a data value of the memory unit and a state of the data processing apparatus.

18. The method as claimed in claim 16, wherein at least one of the first and second graphic controllers includes a plurality of cores configured to process data.

19. The method as claimed in claim 16, wherein the step of changing the state of the second graphic controller comprises:
- changing the state based on one of a data usage in a memory unit, a variation speed of a data value of the memory unit and a state of the data processing apparatus.

20. The method as claimed in claim 15,
- wherein the first graphic controller is integrated into a chipset adapted to perform at least one function in addition to processing the first image, and
- wherein the second graphic controller is not integrated into the chipset.

21. The method as claimed in claim 15, wherein the second graphic controller has a processing speed faster than a processing speed of the first graphic controller.

22. The method as claimed in claim 15, wherein the second graphic controller has a processing speed faster than a processing speed of the first graphic controller.

* * * * *